United States Patent

Barancyk et al.

[11] Patent Number: 6,111,001
[45] Date of Patent: Aug. 29, 2000

[54] COMPOSITIONS CONTAINING RHEOLOGY MODIFIERS WITH FUNCTIONAL GROUP-CONTAINING POLYMERS

[75] Inventors: Steven V. Barancyk; Michael A. Mayo, both of Pittsburgh; Daniel E. Rardon; John W. Burgman, both of Gibsonia; Robert L. Auger, Pittsburgh, all of Pa.

[73] Assignee: PPG Industries Ohio, Inc., Cleveland, Ohio

[21] Appl. No.: 09/198,837

[22] Filed: Nov. 24, 1998

[51] Int. Cl.[7] ........................................ C08K 5/21
[52] U.S. Cl. ............................. 524/211; 524/212
[58] Field of Search .................... 524/211, 212, 524/213

[56] References Cited

U.S. PATENT DOCUMENTS

| | | | |
|---|---|---|---|
| 3,663,506 | 5/1972 | Knopf | 260/45.85 |
| 3,717,597 | 2/1973 | Hesskamp | 260/2.5 |
| 4,076,925 | 2/1978 | Neukam | 526/204 |
| 4,311,622 | 1/1982 | Buter | 260/18 EP |
| 4,383,068 | 5/1983 | Brandt | 524/196 |
| 4,473,678 | 9/1984 | Fink | 524/211 |
| 4,677,028 | 6/1987 | Heeringa et al. | 428/422.8 |
| 4,851,294 | 7/1989 | Buter et al. | 428/425.8 |
| 5,071,896 | 12/1991 | Heinz | 524/212 |
| 5,130,202 | 7/1992 | Keppeler | 428/425.9 |
| 5,256,453 | 10/1993 | Heithorn | 427/415 |
| 5,401,790 | 3/1995 | Poole | 524/199 |

*Primary Examiner*—Paul R. Michl
*Attorney, Agent, or Firm*—William J. Uhl

[57] ABSTRACT

Disclosed are compositions comprised of (a) a polymer containing pendant and/or functional groups selected from the group consisting of carbamate, urethane and/or amide functional groups; and (b) a rheology modifier comprising the reaction product of an amine and an isocyanate; and, optionally, a polymer which is different from the polymer (a) which contains carbamate, urethane and/or amide functional groups. Also disclosed are curable compositions comprised of the compositions described above which further comprise (c) a curing agent having functional groups reactive with the functional groups of the polymer (a). The curable compositions are useful for a variety of applications such as adhesives, sealants and surface coatings where the presence of a carbamate, urethane and/or amide functional polymer in conjunction with the rheology modifier provides improved thixotropy and superior sag resistance.

30 Claims, No Drawings

COMPOSITIONS CONTAINING RHEOLOGY MODIFIERS WITH FUNCTIONAL GROUP-CONTAINING POLYMERS

FIELD OF THE INVENTION

The present invention relates to compositions containing rheology modifiers. More particularly, the present invention relates to curable compositions, such as curable coating compositions, which contain rheology modifiers in conjunction with certain functional group-containing polymers for enhanced flow and sag control.

BACKGROUND OF THE INVENTION

Rheology modifiers, which are commonly referred to as sag control agents, can be an important component of a curable composition, particularly a coating composition. By controlling flow and sag of the coating, the rheology modifiers allow for the deposition of coating with sufficient thickness to impart the necessary durability while maintaining the desired appearance, i.e., gloss, distinctness of image, and smoothness.

Sag control agents such as those described in U.S. Pat. Nos. 4,311,622, 4,677,028 and 4,851,294 are the reaction products of an amine and a diisocyanate, optionally reacted in the presence of a resinous binder. These sag control agents are typically crystalline in nature and their effectiveness is dependent on size and shape of the crystals as well as their concentration. Although the above-identified references disclose the use of these rheology modifiers in coating compositions to provide improved sag resistance, the polymers associated with these coating compositions are mostly hydroxyl functional.

It has been found that the inclusion in compositions, particularly curable coating compositions, of a rheology modifier which is the reaction product of an amine and an isocyanate in conjunction with a polymer having carbamate, urethane and/or amide functional groups provides a greater degree of thixotropy and sag resistance superior to that provided by the inclusion of the rheology modifier with a polymer having hydroxyl functional groups.

SUMMARY OF THE INVENTION

In accordance with the present invention, there is provided a composition comprising (a) a polymer containing functional groups selected from the group consisting of carbamate, urethane and/or amide functional groups; and (b) a rheology modifier comprising the reaction product of an amine and an isocyanate. Optionally, the composition of the invention can contain a polymer (c) which is different from the polymer (a).

Also provided is a curable composition comprising (a) a polymer having pendant and/or terminal functional groups selected from the group consisting of carbamate, urethane and/or amide functional groups; (b) a curing agent having functional groups reactive with the functional groups of (a); and (c) a rheology modifier as described immediately above, provided that the total resin solids content of carbamate, urethane and/or amide group-containing polymer in the curable composition is 5 to 85 weight percent based on the weight of the total solids of the curable composition.

Other than in the operating examples, or where otherwise indicated, all numbers expressing quantities of ingredients or reaction conditions used in the specification or claims are to be understood as being modified in all instances by the term "about". Also, as used herein, the term "polymer" is meant to include oligomers.

DETAILED DESCRIPTION OF THE INVENTION

As aforementioned, the composition of the present invention is comprised of a polymer which contains functional groups selected from the group consisting of carbamate, urethane and/or amide functional groups. The polymer (a) may be any of a variety of polymers, preferably, acrylic polymers, polyester polymers, including alkyds, polyether polymers and polyurethane polymers. Acrylic polymers are preferred. In a preferred embodiment of the invention, the polymer (a) contains carbamate functional groups.

Polymers suitable for use as the polymer (a) are those containing a plurality of terminal or pendant groups of the structure:

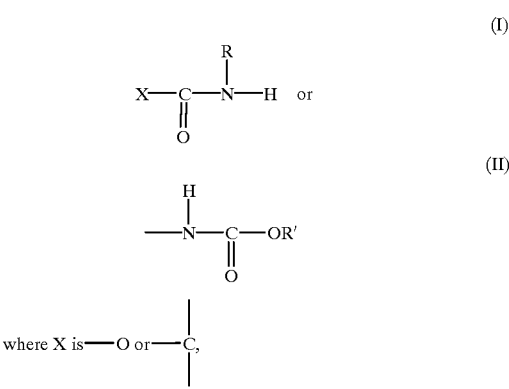

and R is H or alkyl of 1 to 16 carbon atoms or R is bonded to X and forms part of a 5 or 6 membered ring and R' is an aliphatic, cycloaliphatic, aromatic, alkyl or phenolic compound containing from 1 to 18 carbon atoms (for the aliphatic) and 6 to 18 carbon atoms (for the cycloaliphatic, aromatic, alkyl and phenolic compounds). The polymer (a) has on average at least two pendant or terminal groups of structure (I) or (II) per molecule. Preferably X=—O.

Suitable acrylic polymers are copolymers of one or more alkyl esters of acrylic acid or methacrylic acid, and, optionally, one or more other polymerizable ethylenically unsaturated monomers. Suitable alkyl esters of acrylic or methacrylic acid include methyl (meth)acrylate, ethyl (meth)acrylate, butyl (meth)acrylate, and 2-ethylhexyl (meth)acrylate. Other suitable polymerizable ethylenically unsaturated monomers include vinyl aromatic compounds such as styrene and vinyl toluene; nitrites such as acrylonitrile and methacrylonitrile; vinyl and vinylidene halides such as vinyl chloride and vinylidene fluoride; vinyl esters such as vinyl acetate; and acid functional monomers such as acrylic and methacrylic acid.

Hydroxyl functional monomers such as hydroxyethyl acrylate, hydroxypropyl acrylate, hydroxybutyl acrylate, hydroxyethyl methacrylate, and hydroxypropyl methacrylate, may be copolymerized with the acrylic monomers to impart hydroxyl functionality to the acrylic material.

In a preferred embodiment of the invention the acrylic polymer may be prepared from ethylenically unsaturated, beta-hydroxy ester functional monomers, such as those derived from the reaction of an ethylenically unsaturated acid functional monomer, such as monocarboxylic acids, for example, acrylic acid, and an epoxy compound which does not participate in the polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company as CARDURA E; and from Exxon Chemical Company as GLYDEXX-10.

Alternatively, the beta-hydroxy ester functional monomers are prepared from an ethylenically unsaturated, epoxy functional monomer, for example glycidyl (meth)acrylate and allyl glycidyl ether, and a saturated carboxylic acid, such as a saturated monocarboxoylic acid, for example, isostearic acid.

The ethylenically unsaturated acid functional monomer and epoxy compound are typically in an equivalent ratio (acid to epoxy) of about 1:1. The ethylenically unsaturated acid functional monomer and epoxy compound may be pre-esterified prior to polymerization, or esterification and polymerization may take place simultaneously.

Pendant carbamate functional groups of structure (I) (X=—O) may be incorporated into the acrylic polymer by co-polymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate or the reaction product of hydroxypropyl methacrylate, isophorone diisocyanate, and methanol (yielding a urethane of structure II). Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid yielding pendant carbamate groups. Note that the production of isocyanic acid is disclosed in U.S. Pat. No. 4,364,913. Likewise, hydroxyl functional acrylic polymers can be reacted with urea to give an acrylic polymer with pendant carbamate groups.

Pendant amide groups of structure (I)

may be incorporated into the acrylic polymer by co-polymerizing the acrylic monomers with amide functional monomers such as (meth)acrylamide and N-alkyl (meth)acrylamides including N-t-butyl (meth)acrylamide, N-t-octyl (meth)acrylamide, N-isopropyl (meth)acrylamide, and the like. Other suitable amide functional monomers are prepared by reacting a hydroxyl functional amide with (meth)acrylic acid or anhydride, or by the transesterification of (meth)acrylic acid esters with a hydroxyl functional amide such as those described in U.S. Pat. No. 5,780,559.

Alternatively, amide functionality may be incorporated into the polymer by post-reaction, for example, by first preparing an acid functional polymer, such by using (meth) acrylic acid, and then reacting it with ammonia or an amine using conventional amidation reaction conditions, or, alternatively, by preparing a polymer having pendant ester groups (such as by using alkyl (meth)acrylates) and reacting the polymer with ammonia or a primary amine.

Pendant urethane groups (structure II) may be incorporated into the polymer by first forming an NCO group-containing polymer such as an acrylic polymer prepared with meta-tetramethyl xylene isocyanate and reacting the NCO groups with a suitable aliphatic, cycloaliphatic, aromatic, alkyl or phenolic compound containing from 1 to 18 (for the aliphatic compounds) or from 6 to 18 (for the cycloaliphatic, aromatic, alkyl and phenolic compounds) carbon atoms. Examples of suitable compounds include aliphatic alcohols such as methanol, ethanol, n-butyl alcohol, and n-hexanol; cycloaliphatic alcohols such as cyclohexanol; aromatic-alkyl alcohols such as phenyl carbinol and methylphenyl carbinol; phenolic compounds such as phenol itself, and substituted phenols in which the substituents do not adversely affect coating operations. Examples include cresol and nitrophenol.

Mixed pendant carbamate, urethane and/or amide groups may also be used.

The acrylic polymer may be prepared by solution polymerization techniques in the presence of suitable catalysts such as organic peroxides or azo compounds, for example, benzoyl peroxide or N,N-azobis(isobutyronitrile). The polymerization may be carried out in an organic solution in which the monomers are soluble by techniques conventional in the art. Alternately, the acrylic polymer may be prepared by aqueous emulsion or dispersion polymerization techniques well known in the art.

The acrylic polymer typically has a number average molecular weight of from about 500 to 13,000, preferably from about 1000 to 5000 as determined by gel permeation chromatography using a polystyrene standard, and an equivalent weight of less than 5000, preferably within the range of 140 to 2500, based on equivalents of reactive pendant and/or terminal carbamate, urethane and/or amide. The equivalent weight is a calculated or theoretical value based on the relative amounts of the various ingredients used in making the acrylic material and is based on solids of the acrylic material.

Polyesters may also be used in the compositions of the invention and may be prepared by the polyesterification of a polycarboxylic acid or anhydride thereof with polyols and/or an epoxide. Usually, the polycarboxylic acids and polyols are aliphatic or aromatic dibasic acids and diols.

The polyols which are usually employed in making the polyester include alkylene glycols, such as ethylene glycol, 1,6-hexanediol, neopentyl glycol, 2,2-dimethyl-3-hydroxypropyl-2,2-dimethyl-3-hydroxypropionate, 2,2,4-trimethyl-1,3-pentane diol and other glycols, such as hydrogenated Bisphenol A, cyclohexanediol, cyclohexanedimethanol, caprolactone-based diols, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are phthalic acid, isophthalic acid, terephthalic acid, tetrahydrophthalic acid, hexahydrophthalic acid, methyl hexahydrophthalic anhydride, adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of the acids such as dimethyl glutarate and dimethyl terephthalate may be used.

Pendant or terminal carbamate functional groups of structure (I) may be incorporated into the polyester by first forming a hydroxyalkyl carbamate which can be reacted with the polyacids and polyols used in forming the polyester. A polyester oligomer may be prepared by reacting a polycarboxylic acid such as those mentioned above with a hydroxyalkyl carbamate. An example of a hydroxyalkyl carbamate is the reaction product of ammonia and ethylene carbonate or propylene carbonate. The hydroxyalkyl carbamate is condensed with acid functionality on the polyester or polycarboxylic acid, yielding pendant carbamate functionality. Pendant carbamate functional groups of structure (I) may also be incorporated into the polyester by reacting isocyanic acid or a low molecular weight alkyl carbamate such as methyl carbamate with a hydroxyl functional polyester. Also, pendant carbamate functionality may be incorporated into the polyester by reacting a hydroxyl functional polyester with urea.

Pendant or terminal urethane groups may be incorporated into the polyester polymer by preparing an NCO functional polyester polymer and reacting with the alcohols or phenolic compounds mentioned above.

Pendant or terminal amide functional groups of structure (I) may be incorporated into the polyester polymer by preparing a carboxylic acid functional polyester and reacting with ammonia or amine using conventional amidation conditions.

Mixed pendant carbamate, urethane and/or amide groups may also be used in the polyester material.

Polyether polymers suitable for use in the present invention include, but are not limited to, polyether polyols such as polyalkylene ether polyols which include those having the structure:

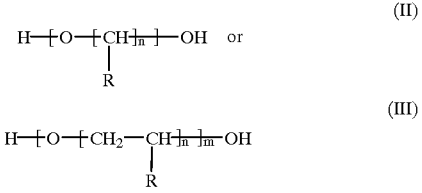

where the substituent R is hydrogen or lower alkyl containing from 1 to 5 carbon atoms including mixed substituents, and n is typically from 2 to 6 and m is from 8 to 100, or higher. Included are poly (oxytetramethylene) glycols, poly (oxytetraethylene) glycols, poly(oxy-1,2-propylene) glycols, and poly(oxy-1,2-butylene) glycols.

Also useful are polyether polyols formed from the oxyalkylation of various polyols, for example, glycols such as ethylene glycol, 1,6-hexanediol, Bisphenol A and the like, or other higher polyols such as trimethylolpropane, pentaerythritol and the like. Polyols of higher functionality which can be utilized as indicated can be made, for instance, by oxyalkylation of compounds such as sucrose or sorbitol.

One commonly utilized oxyalkylation method is reaction of a polyol with an alkylene oxide, for example, propylene or ethylene oxide, in the presence of an acidic or basic catalyst. Specific examples of polyethers include those sold under the trade names TERATHANE and TERACOL, available from E. I. DuPont de Nemours and Company, Inc.

Pendant and/or terminal carbamate functional groups may be incorporated into the polyethers by a "transcarbamoylation" reaction as described above. In this reaction, a low molecular weight carbamate functional material derived from an alcohol or glycol ether is reacted with the hydroxyl groups of the polyether polyol, yielding a carbamate functional polyether and the original alcohol or glycol ether.

Polyurethanes can be formed by reacting a polyisocyanate with a polyester having hydroxyl functionality and containing the pendant carbamate, urethane and/or amide groups. Alternatively, the polyurethane can be prepared by reacting a polyisocyanate with a polyester polyol and a hydroxyalkyl carbamate or hydroxyalkylethylene urea as separate reactants. Examples of suitable polyisocyanates are aromatic and aliphatic polyisocyanates, with aliphatic being preferred because of better color and durability properties. Examples of suitable aromatic diisocyanates are 4,4'-diphenylmethane diisocyanate, 1,3-phenylene diisocyanate, 1,4-phenylene diisocyanate, and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are preferred because of imparting hardness to the product. Examples include 1,4-cyclohexyl diisocyanate, isophorone diisocyanate, alpha, alpha-xylylene diisocyanate and 4,4'-methylene-bis-(cyclohexyl isocyanate).

The polyether, polyester and polyurethane polymers typically have number average molecular weights of about 300 to 5000, preferably about 500 to 3000 as determined by gel permeation chromatography using a polystyrene standard, and an equivalent weight of from about 140 to 2500 based on equivalents of pendant carbamate, urethane and/or amide groups. The equivalent weight is a calculated or theoretical value based on the relative amounts of the various ingredients used in making the polyester or polyurethane and is based on solids of the material.

Besides polymeric materials, relatively low molecular weight materials containing pendant urethane functional groups of structure (II) may be formed by reacting isocyanate terminated monomers or oligomers, such as an isocyanurate of polymeric 1,6-hexamethylene diisocyanate, with an alcohol or phenolic compound such as those mentioned above.

It is possible to prepare blends of the acrylic, polyester, polyether and polyurethane polymers containing pendant or terminal carbamate, urethane and/or amide groups described above.

Optionally, the composition may contain a functional group-containing polymer (c) which is different from the polymer (a). Examples of polymers suitable for use as the optional polymer (c) are those which are reactive with curing agents, for example, aminoplast resins. Preferably, the polymer (c) is a hydroxyl group-containing polymer, such as a polyol. Specific examples include acrylic polyols, polyester polyols, including alkyds, and polyurethane polyols such as those described in U.S. Pat. Nos. 4,311,622 and 4,677,028.

As indicated above, the rheology modifier useful in the present invention is the reaction product of an amine and an isocyanate. The amine may contain one or more amino groups, but preferably the amine is a monoamine and more preferably a monoprimary amine. Suitable monoamines include benzylamine, ethylamine, propylamine, butylamine, pentylamine, hexylamine, methylbutylamine, ethylpropylamine and ethylbutylamine. Additionally, hydroxy containing monoamines may be used such as 2-aminoethanol, 1-aminoethanol, 2-aminopropanol, 3-aminopropaol, 1-amino-2-propanol, 2-amino-2-methylpropanol, 2-aminobutanol, 2-amino-2-methyl -1,3-propanediol, and 2-amino-2-ethyl-1,3-propanediol. Preferably, the monoamine is benzylamine or hexylamine. Examples of other suitable amines for use in the preparation of the rheology modifier are those described in U.S. Pat. Nos. 4,311,622 and 4,677,028.

The isocyanates useful in the preparation of the rheology modifier are preferably monomeric isocyanates, more preferably, di- or tri-isocyanates. The polyisocyanate can be an aliphatic, cycloaliphatic or aromatic polyisocyanate, or mixtures thereof. Diisocyanates are preferred, although higher polyisocyanates such as triisocyanates can be used either in place of or in combination with diisocyanates. Examples of the aliphatic isocyanates are trimethylene, tetramethylene, tetramethylxylylene, pentamethylene, hexamethylene, 1,2-propylene, 1,2-butylene, 2,3-butylene, and 1,3-butylene diisocyanates. Also suitable are cycloaliphatic isocyanates such as 1,3-cyclopentane and isophorone diisocyanates aromatic isocyanates such as m-phenylene, p-phenylene and diphenylmethane-4,4-diisocyanate; aliphatic-aromatic isocyanates such as 2,4- or 2,6-tolulene diisocyanate and 1,4-xylylene diisocyanate; nuclear-substituted aromatic isocyanates such as dianisidine diisocyanate and 4,4-diphenylether diisocyanate; triphenylmethane-4,4,4-triisocyanate, and 1,3,5-triisocyanatobenzene; and dimers and trimers of polyisocyanates such as the isocyanurate of tolulene diisocyanate and hexamethylene diisocyanate. Isothiocyanates corresponding to the above-described isocyanates, where they exist, can be employed as well as mixtures of materials containing both isocyanate and isothiocyanate groups. Isocyanates are commercially available from Bayer U.S.A., Inc. under the trademarks MONDUR and DESMODUR. Preferably the polyfunctional monomeric isocyanate is 1,6-hexamethylene diisocyanate. Examples of suitable isocyanates are described in U.S. Pat. Nos. 4,311,622 and 4,677,028.

The equivalent ratio of amine to isocyanate ranges from 0.7 to 1.5:1, preferably 1:1, with primary amine being considered monofunctional. For optimum sag control, the rheology modifier is crystalline.

Generally, the rheology modifier may be formed by reacting the amine with the isocyanate in a suitable reaction vessel generally at a temperature between 20° C. and 80° C., preferably from 20° C. to 50° C. in the presence of a diluent. In carrying out the reaction, it is preferred that the isocyanate is added to the amine in the reaction vessel. The reaction product, which preferably has been dispersed in a suitable solvent, may then be added to the polymer (a) described above in accordance with the present invention.

In a preferred embodiment of the invention, the rheology modifier is prepared in the presence of the polymer (a), or, alternatively, in the presence of the optional polymer (c) as described above.

The rheology modifier may be incorporated into the polymer (a), or the polymer (c), via a batch process as described in U.S. Pat. Nos. 4,311,622, 4,622,028 and 4,851, 294, or, via a continuous process. Generally, the continuous process for preparing the rheology modifier comprises the simultaneous metering of the amine, the isocyanate, or the reaction product thereof, and the polymer (a), or the polymer (c), into a first high shear mixer to form a mixture as the ingredients flow into and through the first high shear mixer; continuously flowing the mixture into and through a low shear mixing stage; then continuously flowing the mixture into and through a second high shear mixer. Alternatively, the amine and the polymer (a), or the polymer (c), may be premixed prior to the first high shear mixing step.

Typically, the total resin solids content of the polymer (a) in the composition is at least 5 weight percent, preferably from 5 to 85 weight percent, and more preferably from 20 to 65 weight percent, based on total resin solids content of the composition. Typically, the total resin solids content of the rheology modifier in the composition is from 0.1 to 5.0 weight percent, preferably from 0.5 to 3.0 weight percent, based on total resin solids content of the composition. When present, the total resin solids content of the optional polymer (c) is typically less than 80 weight percent, preferably less than 50 weight percent, and more preferably less than 30 weight percent, based on total resin solids content of the composition.

The compositions described above may optionally contain a curing agent having functional groups reactive with the functional groups of the polymer (a), so as to render the compositions curable.

Preferably, the functional groups of polymer (a) are carbamate groups and the curing agent is an aminoplast resin. Preferred aminoplast resins are those which contain methylol ether groups. Aminoplasts are obtained from the reaction of formaldehyde with an amine or amide. The most common, and preferred, amines or amides are melamine, urea, or benzoguanamine. However, condensates with other amines or amides can be used, for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains imino and methylol groups and preferably at least a portion of the methylol groups are etherified with an alcohol to modify the cure response. Any monohydric alcohol may be employed for this purpose including methanol, ethanol, n-butanol, isobutanol and hexanol, with methanol, n-butanol and isobutanol being preferred.

Preferably, the aminoplast resins which are used are melamine-, urea-, or benzoguanamine-formaldehyde condensates, preferably monomeric and at least partially etherified with one or more alcohols containing from one to four carbon atoms. Most preferably, the methylol groups are fully etherified with at least one alcohol selected from the group consisting of methanol, n-butanol and isobutanol.

When present, the resin solids content of the curing agent is typically from 5 to 60 weight percent, preferably from 15 to 45 weight percent, based on total resin solids content of the curable compositions.

The curable compositions of the invention are useful for a variety of applications such as adhesives, sealants and particularly surface coatings.

The curable compositions of the invention can be pigmented or unpigmented. Suitable pigments include opaque, transparent and translucent pigments generally known for use in adhesives, sealants and coating applications. When pigment is used, it is typically present in the composition in amounts such that the pigment to binder ratio is from about 0.03 to 6.0:1.

In addition to the foregoing components, the curable compositions of the invention may include one or more optional ingredients such as plasticizers, anti-oxidants, light stabilizers, mildewcides and fungicides, surfactants and flow control additives or catalysts as are well known in the art.

The components present in the curable composition of the present invention may be dissolved or dispersed in an organic solvent. Organic solvents which may be used include, for example, alcohols, ketones, aromatic hydrocarbons, glycol ethers, esters or mixtures thereof. In solvent-based compositions, organic solvent is typically present in amounts of 5 to 80 percent by weight based on total weight of the composition. Alternatively, the components of the curable compositions of the invention may be dispersed in aqueous media. For example, the polymer (a) can contain additional functional groups such as carboxylic acid groups, which may be neutralized with basic groups to form an emulsion of the polymer in water. Useful amines include, but are not limited to, N-ethylethanolamine, N-methylethanolamine, diethanolamine, N-phenylethanolamine and diisopropanolamine.

The curable composition of the invention can be applied to a substrate by any conventional method such as brushing, dipping, troweling, extruding, flow coating, roll coating, conventional spraying and electrostatic spraying. Typically, they are most often applied by spraying. Usual spray techniques and equipment for air spraying and electrostatic spraying and either manual or automatic methods can be used.

The compositions can be applied by conventional methods over a wide variety of primed and unprimed substrates such as wood, metal, glass, cloth, leather, plastics, foams and the like; however, they are particularly useful over metal substrates.

The curable compositions can be cured at ambient temperatures or thermally cured at elevated temperatures, typically for 1 to 30 minutes at 250° F. to 450° F. (121° C. to 232° C.) with temperatures primarily dependent upon the type of substrate used. Dwell time (i.e., time that the coated substrate is exposed to elevated temperature for curing) is dependent upon the cure temperature used as well as wet film thickness of the applied composition. For example, coated automotive elastomeric parts require a long dwell time at a lower cure temperature (e.g., 30 minutes/250° F. (121° C.)), while coated aluminum beverage containers require a very short dwell time at a very high cure temperature (e.g., 1 minute/375° F. (191° C.)). The curable compositions of the invention are particularly useful as primers and as color and/or clear coats in color-clear composite coatings. The compositions of the invention in the pigmented form can be applied directly to a substrate to form a color coat. The color coat may be in the form of a primer for subsequent application of a top coat or may be a colored top coat. Alternatively, the coating composition of the invention can be unpigmented, in the form of a clear coat for application over a color coat (either a primer coat or a colored top coat). When used as a primer coating, thicknesses of 0.4 to 4.0 mils are typical. When used as a color top coat, coating thicknesses of about 0.5 to 4.0 mils are usual, and when used as a clear coat, coating thicknesses of about 1.0 to 4.0 mils are generally used.

In applying composite coatings using the curable composition of the present invention, the initially applied coating can be cured prior to the application of the second coat. Alternatively, the coating can be applied by a wet-on-wet technique in which the second coating is applied to the first coating (usually after a flash time at room temperature or slightly elevated temperature to remove solvent or diluent, but insufficient time to cure the coating) and the two coatings are co-cured in a single step.

Only one of the coatings in the composite coating needs to be based on the curable coating composition of the present invention. The other coating composition can be based on a film-forming system containing a thermoplastic and/or thermosetting film-forming resin well known in the art such as cellulosics, acrylics, polyurethanes, polyesters including alkyds, aminoplasts, epoxies and mixtures thereof. These film-forming resins are typically formulated with various other coatings ingredients such as pigments, solvents and optional ingredients mentioned above.

The following examples illustrate the invention and should not be construed as a limitation on the scope thereof. Unless specifically indicated otherwise, all percentages and amounts are by weight.

EXAMPLES

Example A describes the preparation of a hydroxyl functional group-containing acrylic polymer and Example B describes the preparation of an acrylic polymer containing both hydroxyl and carbamate functional groups. Examples C and D describe the preparation of two dispersions of a rheology modifier in functional group-containing polymers prepared as in Examples A and B, respectively. Example C describes the preparation of a dispersion of a rheology modifier in an acrylic polymer which was prepared as the polymer of Example A. Example D describes the preparation of a dispersion of a rheology modifier in an acrylic polymer which was prepared as the polymer of Example B.

Example 1 describes the preparation of a pre-mix used to formulate the curable coating compositions of Examples 2–6. Examples 2 through 4 are comparative examples. Example 2 describes the preparation of a curable composition containing no rheology modifier and the hydroxyl group-containing polymer of Example A. Example 3 describes the preparation of a curable coating composition containing no rheology modifier and the acrylic polymer of Example B. Example 4 describes the preparation of a curable coating composition containing the hydroxyl group-containing polymer of Example A and the rheology modifier ("RM") of Example C. This coating composition contains only hydroxyl, and no carbamate, functional group-containing polymer. Example 5 describes the preparation of a curable coating composition of the invention containing the acrylic polymer of Example B which contains both hydroxyl and carbamate functional groups, and the rheology modifier of Example C. Example 6 describes the preparation of a curable coating composition of the invention which contains the hydroxyl group-containing acrylic polymer of Example A and the rheology modifier of Example D which is prepared in an acrylic polymer having carbamate functional groups. The data of Table 1 illustrates that the rheology modifier, when used in the presence of a carbamate functional polymer, provides a greater degree of thixotropy and sag resistance superior to that observed with no rheology modifier, or with the rheology modifier in conjunction with a polymer having only hydroxyl groups.

Example A

An acrylic polymer containing hydroxyl functional groups was prepared from the following ingredients:

| CHARGE # | INGREDIENT | WEIGHT IN PARTS |
|---|---|---|
| 1 | AROMATIC 100[1] | 128.5 |
|   | CARDURA E[2] | 139.3 |
|   | xylene | 74.4 |
| 2 | zinc octoate | 0.6 |
|   | xylene | 16.8 |
| 3 | di-t-amyl peroxide | 9.7 |
|   | AROMATIC 100 | 31.3 |
| 4 | 2-ethylhexyl acrylate | 58.4 |
|   | hydroxyethyl methacrylate | 96.7 |
|   | acrylic acid | 45.9 |
|   | styrene | 145.7 |
| 5 | AROMATIC 100 | 5.0 |
| 6 | AROMATIC 100 | 5.0 |

[1]Mixed aromatics solvent, available from Exxon Chemicals America.
[2]Glycidyl ester of branched $C_{10}$ saturated carboxylic acid available from Shell Chemical Co.

The ingredients of Charge 1 were added in order to a suitable reactor vessel equipped for reflux conditions and mixed under a predominately $N_2$ atmosphere. Charge 2 was then added to the reactor in the order given followed by heat to reflux temperature (162° C.). Addition of Charge 3 was then begun and continued over a period of 255 minutes. Five minutes after the beginning of Charge 3, Charge 4 addition was begun and continued over a period of 240 minutes. At the completion of Charge 4, Charge 5 was added to the reactor as a rinse for that charge. Similarly, at the completion of Charge 3, Charge 6 was also added to the reactor as a rinse for that charge. The reaction mixture was then held at reflux for 90 minutes. The resulting product had a measured solids of 65 percent (1 hour at 110° C.), a viscosity of Z3- on the Gardner-Holt scale, a solution OH value of 96.9, an acid value of 8.4, and a weight average molecular weight of 8700 as determined by gel permeation chromatography versus a polystyrene standard.

Example B

An acrylic polymer containing both carbamate and hydroxyl functional groups was prepared from the following ingredients:

| CHARGE # | INGREDIENT | WEIGHT IN PARTS |
|---|---|---|
| 1 | xylene | 47.6 |
|   | CARDURA E | 126.0 |
|   | AROMATIC 100 | 113.9 |
| 2 | Zinc octoate | 0.5 |
|   | xylene | 15.0 |
| 3 | di-t-amyl peroxide | 8.8 |
|   | AROMATIC 100 | 45.0 |
| 4 | 2-ethylhexyl acrylate | 58.0 |
|   | hydroxyethyl acrylate | 87.5 |
|   | styrene | 132.0 |
|   | acrylic acid | 36.3 |
|   | xylene | 10.0 |
|   | AROMATIC 100 | 10.0 |
| 5 | DOWANOL PM[1] | 6.0 |
| 6 | DOWANOL PM | 5.0 |
| 7 | triphenylphosphite | 0.3 |
|   | xylene | 7.0 |

-continued

| CHARGE # | INGREDIENT | WEIGHT IN PARTS |
|---|---|---|
| 8 | triphenylphosphite | 0.75 |
|   | butyl stannoic acid | 0.75 |
|   | Dowanol PM | 7.0 |
| 9 | DOWANOL PM carbamate[2] | 238.8 |
|   | (38% solution in Dowanol PM) |  |
| 10 | DOWANOL PM | 10.0 |
| 11 | Initial strip distillate | 265.0 |

[1]1-methoxy-2-propanol available from Dow Chemical Co.
[2]Reaction product of DOWANOL PM and urea.

The ingredients of Charge 1 were added to a suitable reactor vessel equipped for reflux conditions under a predominately $N_2$ atmosphere and mixed for 15 minutes. Charge 2 was then added to the reactor in the order given, followed by heating to reflux temperature (168° C.). Addition of Charge 3 was begun and continued over a period of 255 minutes. Five minutes after the beginning of Charge 3, the Charge 4 addition was begun and continued over a period of 240 minutes. At the completion of Charge 4, Charge 5 was added to the reactor as a rinse for that charge. Similarly, at the completion of Charge 3, Charge 6 was also added to the reactor as a rinse for that charge. Charge 7 was then added to the reactor in the order given and the reaction mixture held at reflux for 90 minutes. The solvent was then stripped from the reaction mixture under reduced pressure and set aside for use as the final reducing solvent. Upon completion of the strip, Charge 8 was added to the reactor in the order given, then Charge 9 was added over a period of 180 minutes. During this addition, DOWANOL PM was removed from the reactor under reduced pressure. At the completion of Charge 9, Charge 10 was added to the reactor as a rinse for Charge 9. Pressure was gradually reduced until a pressure of approximately 50 mm Hg was obtained. The reaction temperature was increased to 150° C., and held at this temperature until distillate evolution was essentially complete. Upon cooling the reaction product was thinned with Charge 11. Prior to thinning, the resin was found to have a OH value of 62.3. The final thinned resin had a measured solids of 57.7, a viscosity of Z2+ on the Gardner-Holt scale, an acid value of 3.2, a number average molecular weight of 3042, and a weight average molecular weight of 12583 as determined by gel permeation chromatography versus a polystyrene standard, and a theoretical carbamate equivalent weight of 665.

Example C

A rheology modifier prepared in the presence of an acrylic polymer having hydroxyl functional groups was prepared from the following ingredients:

| CHARGE # | INGREDIENT | WEIGHT IN PARTS |
|---|---|---|
| 1 | OH functional acrylic resin[1] | 320.00 |
|   | AROMATIC 100 | 71.50 |
|   | xylene | 38.90 |
|   | benzylamine | 5.72 |

-continued

| CHARGE # | INGREDIENT | WEIGHT IN PARTS |
|---|---|---|
| 2 | 1,6-hexamethylene diisocyanate | 4.47 |
|  | AROMATIC 100 | 8.85 |
|  | xylene | 4.56 |

[1]Acrylic resin comprised of 28.65% CARDURA E, 30.0% styrene, 19.9% hydroxymethyl methacrylate, 13.19% 2-ethylhexyl acrylate, and 8.26% acrylic acid, with the percentages based on total weight of monomers, and having a number average molecular weight of 2697, a weight average molecular weight of 7709 as determined by gel permeation chromatography versus a polystyrene standard, a viscosity of Z1 on the Gardner-Holt scale, and a measured solids (110° C., 1 hr) of 65.3% in a 66:34 blend of AROMATIC 100 and xylene, prepared in the same manner as the acrylic of Example A.

Charge 1 was charged to a open cylindrical flask equipped with a Cowles blade agitator. The agitator was set to 1350 rpm and the reaction mixture was heated to 35° C. Charge 2 was then added to the reaction mixture followed by 60 seconds of agitation. The agitation was then stopped and the reaction mixture was allowed to stand for approximately 300 seconds, after which time agitation was resumed at 2000 rpm for an additional 60 seconds. The resultant product was a dispersion of rheology modifier particles in acrylic resin which had a theory solids of 47 percent and a Brookfield viscosity (#6 spindle) of 12000 cps at 5 rpm and 1700 cps at 100 rpm.

Example D

A rheology modifier dispersed in an acrylic polymer having both carbamate and hydroxyl functional groups was prepared from the following ingredients:

| CHARGE | INGREDIENT | WEIGHT IN PARTS |
|---|---|---|
| 1 | OH/carbamate functional acrylic resin[1] | 320.00 |
|  | AROMATIC 100 | 134.77 |
|  | xylene | 69.43 |
|  | benzylamine | 5.39 |
| 2 | 1,6-hexamethylene diisocyanate | 4.21 |
|  | AROMATIC 100 | 8.33 |
|  | xylene | 4.29 |

[1]Carbamate functional acrylic resin prepared from the acrylic polyol of Example C using the carbamoylation procedure of Example B, having a number average molecular weight of 2702, a weight average molecular weight of 12837 as determined by gel permeation chromatography versus a polystyrene standard, a hydroxyl value of 70.7 (at 100% theory solids), a viscosity of Z2 on the Gardner-Holt scale, and a measured solids (1 hour at 110° C.) of 57.3% in a 66:34 blend of AROMATIC 100 and xylene, and a theoretical carbamate equivalent weight of 665

Charge 1 was added to an open cylindrical flask equipped with a Cowles blade agitator. The agitator was set to 1350 rpm and the reaction mixture was heated to 35° C. Charge 2 was then added to the reaction mixture followed by heating 60 seconds of agitation. The agitation was then stopped and the reaction mixture was allowed to stand for approximately 300 seconds, after which time agitation was resumed at 2000 rpm for an additional 60 seconds. The resulting rheology modifier dispersion had a theory solids of 36.8 percent and a Brookfield viscosity (#6 spindle) of 7000 cps at 5 rpm and 950 cps at 100 rpm.

Example 1

A curable coating composition pre-mixture was prepared from the following ingredients:

| INGREDIENT | PARTS BY WEIGHT (grams) | SOLIDS (grams) |
|---|---|---|
| AROMATIC 100 | 15.0 | 0.00 |
| Butanol | 6.0 | 0.00 |
| EKTAPRO EEP[1] | 3.6 | 0.00 |
| TINUVIN 928[2] | 2.0 | 2.00 |
| TINUVIN 292[3] | 0.8 | 0.80 |
| polybutyl acrylate[4] | 0.52 | 0.26 |
| WORLEE 315[5] | 2.00 | 0.20 |
| DDBSA[6] | 0.71 | 0.50 |
| SETAMINE US-138[7] | 50.00 | 35.00 |

[1]Ethyl-3-ethoxy propionate solvent available from Eastman Chemicals.
[2]Benzotriazole UV light stabilizer available from Ciba Geigy Corporation.
[3]Hindered amine stabilizer available from Ciba-Geigy Corporation.
[4]Polybutyl acrylate having a Mw of about 6700 and an Mn of about 2600 made in xylene at 50% solids.
[5]Solution of silicon-glycol copolymer in isopropanol.
[6]Solution of dodecyl benzene sulfonic acid in isobutanol.
[7]Butylated melamine-formaldehyde resin (70% solids in butanol) available from Akzo Nobel Resins.

The above ingredients were blended together under mild agitation to form the premix.

Examples 2–6

The premix of Example 1 was used in the preparation of each of the curable coating compositions of Examples 2–6. Examples 2–4 are comparative examples which describe the preparation of curable compositions which contain either no rheology modifier at all, or a rheology modifier in conjunction with a hydroxyl group-containing polymer containing no carbamate functionality. Examples 5 and 6 describe the preparation of curable compositions of the invention which contain a rheology modifier in conjunction with a carbamate group-containing polymer. The amounts listed are by weight resin solids:

| Example | Pre-mixture of Example 1 | Resin of Example A | Resin of Example B | RM of Example C | RM of Example D |
|---|---|---|---|---|---|
| 2 | 38.76 | 65.0 | 0.0 | 0.0 | 0.0 |
| 3 | 38.76 | 35.0 | 30.0 | 0.0 | 0.0 |
| 4 | 38.76 | 35.0 | 0.0 | 30.0 | 0.0 |
| 5 | 38.76 | 5.0 | 30.0 | 30.0 | 0.0 |
| 6 | 38.76 | 35.0 | 0.0 | 0.0 | 30.0 |

The resultant curable coating compositions were reduced to a viscosity of 30 seconds (as measured using a #4 Ford cup at 24 degrees centigrade) with a blend of equal parts AROMATIC 100 and xylene. The reduced curable compositions were then spray applied to a pigmented base coat (commercially available from PPG Industries, Inc., as ACHAT GRAU) to form color-plus-clear composite coatings over steel panels.

The primed steel sag test panels, available from Herberts Automotive Systems, are 30 cm by 57 cm with two rows of 1 cm diameter holes along the left side. The rows of holes are 3 cm apart center-to-center, and the spacing between the holes in each row is 4 cm center-to-center.

The base coat was spray applied in two coats to the test panels at a temperature of about 24° C., with a 90 second flash between the two base coat applications. A flash time of 300 seconds was allowed before application of the clear coating composition to the base coat. The curable compositions of Examples 2–6 were each spray applied to a base coated panel at 24° C. in two coats with a ninety second flash between the coats. For the second coat only the bottom half of the panel was coated in order to produce a test panel with varying clear coat film thickness down the length of the panel. The composite coating was allowed to air flash at 24° C. for ten minutes in a vertical position. The panel was then cured in this vertical position for 30 minutes at 293° C. to co-cure the base coat and the clear coat.

The test panels prepared as described above were evaluated for gloss, hardness, complex viscosity and sag limit. Test results are reported in the following Table 1.

TABLE 1

| Example # | 20° Gloss[1] | Knoop Hardness[2] | Complex Viscosity[3] (cP) | 1 cm Sag Limit[4] ($\mu$m) |
| --- | --- | --- | --- | --- |
| 2 | 95.3 | 12.4 | 150 | 36 |
| 3 | 94.7 | 12.3 | 150 | 36 |
| 4 | 95.0 | 12.5 | 500 | 52 |
| 5 | 94.6 | 12.4 | 600 | 58 |
| 6 | 94.5 | 12.1 | 600 | 58 |

[1]20° Gloss measured at 46 microns clear coat film thickness.
[2]Knoop microhardness measured via a Tukon Microhardness Instrument Model 300, manufactured by Wilson Instruments, Division of Instron Corporation, according to ASTM-D1474-92. A load of 25 grams was used on the indenter for this test method. A higher number indicates greater hardness.
[3]Complex viscosity measured via a Paar Physica UDS 200 cone (50 m.m., 1°) and plate Rheometer employing oscillations of 0.2 Pa amplitude and 2 Hz frequency, at 25° C. The value is reported after 10 minutes of oscillations following 50 seconds pre-shear at 5,000 reciprocal seconds.
[4]Using the aforementioned panels with two rows of 1 cm holes, flashed and baked in the vertical orientation with increasing clear coat film thickness as described previously, the clear coat film thickness is reported in microns measured next to the hole where a 1 cm sag drip is observed.

The data of Table 1 illustrate the enhanced thixotropy and sag resistance performance of the rheology modifier in the presence of carbamate-functional polymer over a system containing the rheology modifier in the presence of only hydroxyl group-containing acrylic polymer. This effect was observed regardless of whether the rheology modifier was prepared in the presence of the carbamate group-containing polymer or in the presence of the hydroxyl group-containing polymer.

What is claimed is:

1. A film-forming composition comprising the following components:
    (a) a polymer containing pendant and/or terminal functional groups selected from the group consisting of carbamate, urethane and amide functional groups; and
    (b) a crystalline rheology modifier comprising the reaction product of an amine and an isocyanate.

2. The composition of claim 1 wherein the functional groups of the polymer (a) are carbamate functional groups.

3. The composition of claim 2 wherein the composition further comprises a polymer (c) which is different from the polymer (a).

4. The composition of claim 2 wherein the rheology modifier is prepared in the presence of the polymer (a).

5. The composition of claim 3 wherein the polymer (c) is a hydroxyl group-containing polymer.

6. The composition of claim 5 wherein the rheology modifier is prepared in the presence of the polymer (c).

7. The composition of claim 2 wherein the total resin solids content of the polymer (a) in the composition is at least 5 percent by weight based on total resin solids content of the composition.

8. The composition of claim 2 wherein the polymer (a) is selected from the group consisting of acrylic polymers, polyester polymers, polyether polymers, and polyurethane polymers.

9. The composition of claim 8 wherein the polymer (a) is an acrylic polymer derived from the polymerization of an ethylenically unsaturated, beta-hydroxy ester functional monomer which is the reaction product of an ethylenically unsaturated acid functional monomer and an epoxy compound containing at least 5 carbon atoms which is not polymerizable with the ethylenically unsaturated acid functional monomer; and at least one other polymerizable ethylenically unsaturated monomer.

10. The composition of claim 2 wherein the amine is a monoamine.

11. The composition of claim 10 wherein the monoamine is selected from the group consisting of benzylamine and hexylamine.

12. The composition of claim 2 wherein the isocyanate is a polyfunctional monomeric isocyanate.

13. The composition of claim 12 wherein the isocyanate is 1,6-hexamethylene diisocyanate.

14. The composition of claim 2 wherein the rheology modifier (b) is characterized in that the ratio of amine to isocyanate is 0.7 to 1.5:1.

15. A curable film-forming composition comprising the following components:
    (a) a polymer having pendent and/or terminal functional selected from the group consisting of carbamate, urethane and amide functional groups;
    (b) a crystalline rheology modifier comprising the reaction product of an amine and an isocyanate; and
    (c) a curing agent having functional groups reactive with the functional groups of the polymer (a).

16. The curable composition of claim 15 wherein the functional groups of polymer (a) are carbamate functional groups.

17. The curable composition of claim 16 wherein the composition further comprises a polymer (d) which is different from the polymer (a).

18. The curable composition of claim 16 wherein the rheology modifier is prepared in the presence of the polymer (a).

19. The curable composition of claim 17 wherein the polymer (d) is a hydroxyl group-containing polymer.

20. The curable composition of claim 19 wherein the rheology modifier is prepared in the presence of the polymer (d).

21. The curable composition of claim 16 wherein the polymer (a) is selected from the group consisting of acrylic polymers, polyester polymers, polyether polymers, and polyurethane polymers.

22. The curable composition of claim 21 wherein the polymer (a) is an acrylic polymer derived from the polymerization of an ethylenically unsaturated, beta-hydroxy ester functional monomer which is the reaction product of an ethylenically unsaturated acid functional monomer and an epoxy compound containing at least 5 carbon atoms which is not polymerizable with the ethylenically unsaturated acid functional monomer; and at least one other polymerizable ethylenically unsaturated monomer.

23. The curable composition of claim 16 wherein the total resin solids content of the polymer (a) in the curable composition is at least 5 percent by weight based on total resin solids content of the curable composition.

24. The curable composition of claim 16 wherein the amine is a monoamine.

25. The curable composition of claim 24 wherein the monoamine is selected from the group consisting of benzylamine and hexylamine.

26. The curable composition of claim 16 wherein the isocyanate is a polyfunctional monomeric isocyanate.

27. The curable composition of claim 26 wherein the isocyanate is 1,6-hexamethylene diisocyanate.

28. The curable composition of claim 16 wherein the rheology modifier is characterized in that the ratio of amine to isocyanate is 0.7 to 1.5:1.

29. The curable composition of claim 16 wherein the curing agent (c) is an aminoplast resin.

30. A curable coating composition comprising:

from 5 to 85 percent by weight of a film-forming polymer selected from the group consisting of acrylic polymers, polyester polymers, polyether polymers and polyurethane polymers, said film-forming polymer having pendant and/or terminal carbamate functional groups;

from 0.1 to 5.0 percent by weight of a crystalline rheology modifier comprised of the reaction product of an amine and an isocyanate; and from 5.0 to 60 percent by weight of an aminoplast curing agent, where weight percentages are based on the total solids weight of the curable coating composition.

* * * * *